(12) United States Patent
Torniainen et al.

(10) Patent No.: US 10,479,044 B2
(45) Date of Patent: Nov. 19, 2019

(54) FIBER SHEETS AND STRUCTURES COMPRISING FIBER SHEETS

(71) Applicant: PAPTIC LTD, Espoo (FI)

(72) Inventors: Esa Torniainen, Espoo (FI); Tuomas Mustonen, Espoo (FI); Karita Kinnunen, Espoo (FI); Tuomo Hjelt, Vtt (FI)

(73) Assignee: PAPTIC LTD, Espoo (FI)

( * ) Notice: Subject to any disclaimer, the term of this patent is extended or adjusted under 35 U.S.C. 154(b) by 75 days.

(21) Appl. No.: 15/529,142

(22) PCT Filed: Nov. 20, 2015

(86) PCT No.: PCT/FI2015/050811
§ 371 (c)(1),
(2) Date: May 24, 2017

(87) PCT Pub. No.: WO2016/083667
PCT Pub. Date: Jun. 2, 2016

(65) Prior Publication Data
US 2017/0260694 A1    Sep. 14, 2017

(30) Foreign Application Priority Data

Nov. 24, 2014 (FI) .................................. 20146033

(51) Int. Cl.
| | | |
|---|---|---|
| *B32B 1/02* | (2006.01) | |
| *B32B 5/18* | (2006.01) | |
| *B32B 5/06* | (2006.01) | |
| *B32B 5/10* | (2006.01) | |
| *B32B 1/08* | (2006.01) | |
| *B32B 5/08* | (2006.01) | |
| *B65D 65/46* | (2006.01) | |
| *D21F 11/00* | (2006.01) | |
| *D21H 13/40* | (2006.01) | |
| *D21H 13/32* | (2006.01) | |
| *D21H 17/37* | (2006.01) | |
| *B65D 65/38* | (2006.01) | |
| *D21H 13/30* | (2006.01) | |
| *D21H 13/38* | (2006.01) | |
| *D21H 17/34* | (2006.01) | |

(52) U.S. Cl.
CPC .................. *B32B 1/02* (2013.01); *B32B 1/08* (2013.01); *B32B 5/06* (2013.01); *B32B 5/08* (2013.01); *B32B 5/10* (2013.01); *B32B 5/18* (2013.01); *B65D 65/46* (2013.01); *B65D 65/466* (2013.01); *D21F 11/002* (2013.01); *D21H 13/32* (2013.01); *D21H 13/40* (2013.01); *D21H 17/37* (2013.01); *B65D 65/38* (2013.01); *D21H 13/30* (2013.01); *D21H 13/38* (2013.01); *D21H 17/34* (2013.01)

(58) Field of Classification Search
CPC .... B32B 5/06; B32B 5/08; B32B 5/10; B32B 5/18; B32B 1/02; B32B 1/08; B65D 65/46; B65D 65/466; D21F 11/002
See application file for complete search history.

(56) References Cited

U.S. PATENT DOCUMENTS

| | | | |
|---|---|---|---|
| 3,716,449 A | | 2/1973 | Gatward et al. |
| 4,597,831 A | | 7/1986 | Anderson |
| 5,372,877 A | * | 12/1994 | Kannankeril ..... A61F 13/15252 428/311.71 |
| 5,720,851 A | * | 2/1998 | Reiner .................. D21F 11/002 162/101 |
| 2006/0137799 A1 | | 6/2006 | Haque et al. |
| 2010/0173138 A1 | | 7/2010 | Williams et al. |

FOREIGN PATENT DOCUMENTS

| | | |
|---|---|---|
| CN | 1127816 | 7/1996 |
| CN | 1474895 | 2/2004 |
| CN | 101163827 | 4/2008 |
| CN | 101302319 | 11/2008 |
| EP | 0195458 A1 | 9/1986 |
| EP | 0481746 A1 | 4/1992 |
| EP | 1 094 164 | 4/2001 |
| EP | 2781652 A1 | 9/2014 |
| GB | 1314211 | 4/1973 |
| GB | 1329409 | 9/1973 |
| GB | 1397378 | 6/1975 |
| GB | 1411438 | 10/1975 |
| JP | H05-44149 A | 2/1993 |
| JP | H08-174471 A | 7/1996 |
| JP | H10-504613 A | 5/1998 |
| JP | H10-508662 A | 8/1998 |
| JP | H11-500190 A | 1/1999 |
| JP | 2005-240253 A | 9/2005 |
| JP | 2010-229604 A | 10/2010 |
| JP | 2011-207162 A | 10/2011 |
| WO | 96/02702 | 2/1996 |

(Continued)

OTHER PUBLICATIONS

FI, Search Report, Finnish Patent Application No. 20146033, 2 pages, dated Jun. 25, 2015.
PCT, International Search Report, International Application No. PCT/FI2015/050811, 4 pages, dated Mar. 3, 2016.
PCT, Written Opinion of the International Searching Authority, International Application No. PCT/FI2015/050811, 5 pages, dated Mar. 3, 2016.

(Continued)

*Primary Examiner* — Walter Aughenbaugh
(74) *Attorney, Agent, or Firm* — Thompson Hine LLP

(57) ABSTRACT

The invention relates to fiber sheets, to structures comprising the fiber sheets and to the use of the sheets. The invention further relates to biodegradable and/or recyclable products comprising the fiber sheets, useful in replacing non-biodegradable products.

26 Claims, 10 Drawing Sheets

(56) References Cited

FOREIGN PATENT DOCUMENTS

| | | |
|---|---|---|
| WO | 96/06222 A1 | 2/1996 |
| WO | 96/12615 A1 | 5/1996 |
| WO | 96/25556 A1 | 8/1996 |
| WO | 2013/144449 | 10/2013 |

OTHER PUBLICATIONS

CN, English translation of First Office Action, Chinese Application No. 201580074324.2 (dated Apr. 29, 2019).
Japan Patent Office, Notice of Reasons for Refusal (with English Translation), Japanese Patent Application No. 546043/2017, 7 pages, dated Aug. 27, 2019, last 3 pages in Japanese only.

* cited by examiner

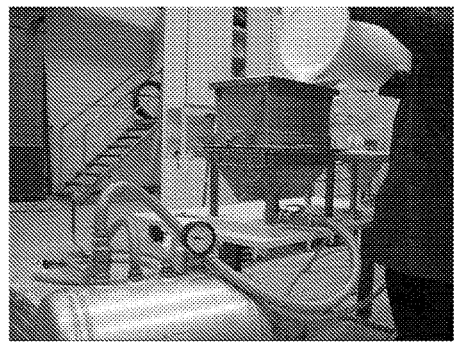
Fig 8A
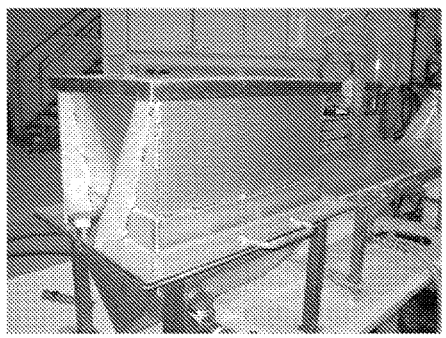
Fig 8B
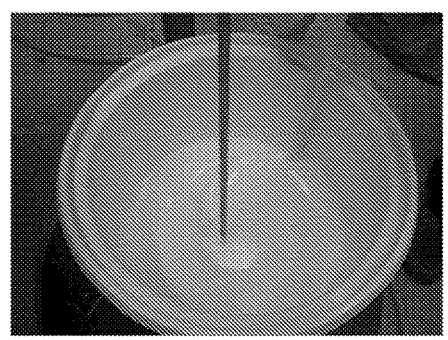
Fig 8C
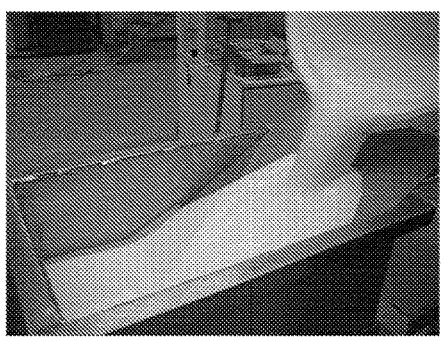
Fig 8D
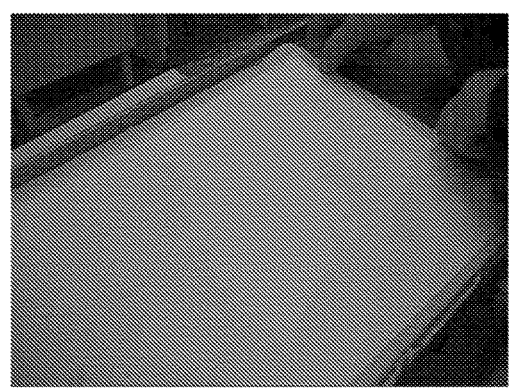
Fig. 8E
Fig. 8

FIBER SHEETS AND STRUCTURES COMPRISING FIBER SHEETS

CROSS REFERENCE TO RELATED APPLICATIONS

This application is a National Stage Application under 35 U.S.C. 371 of International Application No. PCT/FI2015/050811, having an international filing date of 20 Nov. 2015, which claims the benefit of FI patent application number 20146033, filed 24 Nov. 2014, each of which are hereby incorporated by reference in their entirety.

FIELD

This document relates to fiber sheets, to structures comprising the fiber sheets, to the use of the fiber sheets and to a method for the manufacture of the fiber sheets. The document further relates to biodegradable and/or recyclable products comprising the fiber sheets, useful in replacing non-biodegradable products.

BACKGROUND

Polymeric products, such as plastic packaging materials, plastic bags, and other plastic applications have become a serious environmental problem. It is estimated that each EU citizen uses an average of 200 plastic bags every year. The plastic bags are kept for an average of 20 minutes and it takes about 1000 years to degrade the plastic bags. About 4 Mtn on yearly basis of plastic material, particularly plastic bags, can be found in the seas and oceans, where it cause serious damage to the sea ecosystem. The new amendment to the EU waste directive and implementation of the directive on individual country level is targeting to reduce the usage of plastic bags to level of 90 bags per citizen by 2019 and further to 40 bags by 2025. Currently only about 6.6% of plastic bags are recycled and more than 8% ends up as litter. Thus environmentally acceptable, consumer preferred, recyclable and biodegradable substitute materials for plastic bags are needed.

Corresponding products traditionally made of paper, such as paper bags are also used. However, they have poor water resistance, they are relatively high in weight (e.g. in comparison to plastics), they are inflexible, their converting process is slow, they have poor user experience and preference, and they generally have limited strength properties, especially related to tear.

Further, plastic bags made of biodegradable plastic, such as polylactic acids or polymeric starch are available, but they have limited water resistance as well as user acceptance and strength properties. Starch products further compete with food production, which is a serious concern for the sustainability and land use.

CN101302319 describes biodegradable shopping bags made of a slurry comprising refined grass, wheat straw, bagasse, annual herb leaves and stems, polyvinyl alcohol, optional gypsum, salt, defoamer and water-proofing agent, where the slurry is poured in a mold, dewatered and dried to obtain a sheet, which is formed to a shopping bag.

Technique relating to methods for producing foam-laid fiber webs is known technology particularly in the field of manufacture of non-woven and tissue products. Fiber web is formed from a dispersion of fibers in a foamed liquid. A pulp or fiber furnish is first prepared in a pulper, followed by dewatering, mixing with a foam or foamable liquid containing a surfactant and water. The fibers are dispersed in the foam and the formed fiber-foam is deposited on a wire and the main portion of the liquid, which is essentially in the form of foam, is removed by a suction. This technique is disclosed in EP 481746. Surfactants may be of any suitable type, such as anionic, cationic, non-ionic and amphoteric surfactants. Additionally, wet-strengtheners, binders, creping chemicals etc. may be used. Surfactants used in the foaming process are generally regarded as having a negative influence on both the dry and wet tensile strength of a paper web.

Based on the above it can be seen that there exists a need to provide environmentally acceptable and biodegradable substitute materials for non-degradable plastics presently used in various applications, such as packaging, plastic bags, etc.

SUMMARY

An object of the present disclosure is to overcome or substantially reduce the above described problems relating to the use of non-biodegradable plastic materials, such as packaging materials, by way of finding a new material, which is biodegradable and/or recyclable using the currently available recycling systems, flexible, easy to manufacture, user friendly (both consumer and retailer), cost effective, particularly related to water, energy, chemical and material costs, and has sufficient strength properties.

A further object of the disclosure is to provide fiber sheets, which can be used for replacing plastic materials.

A still further object of the disclosure is to provide structures comprising the fiber sheets.

A still further object of the disclosure is to provide uses of the fiber sheets in packaging, in carrier bags and sacks, covering, construction, clothing and fabrics, graphics and interior design applications.

A still further object of the disclosure is to provide a method for the manufacture of the fiber sheets.

Provided in this disclosure is a fiber sheet, which is obtainable by foam based production technology, it comprises fibers, a binder and a foaming polymer, and where 50-99 wt % of the fibers are natural fibers and 1-50 wt % of the fibers are reinforcement fibers selected from polymer fibers, mineral fibers, non-wood natural fibers and glass-fibers and combinations thereof, and where the sheet has properties typically characterizing plastic materials, flexibility, heat sealability, hydrophobicity, water repellency, elongation and strength, and where the sheet is biodegradable and/or recyclable.

Also provided in this disclosure is a fiber sheet, which is obtainable by foam based production technology, it comprises fibers having average fiber length of 0.5-100 mm, a binder and a foaming agent, and where 50-99 wt % of the fibers are natural fibers and 1-50 wt % of the fibers are reinforcement fibers selected from polymer fibers, mineral fibers, non-wood natural fibers and glass-fibers and combinations thereof, and where the fiber sheet has stretch in the range of 3-50%. The fiber sheet is biodegradable and/or recyclable.

Further provided in this disclosure are structures comprising the fiber sheets.

Also provided in this disclosure is a method for the manufacture of a fiber sheet, where the method comprises the steps of forming at least one foamed dispersion by dispersing fibers comprising natural fibers and reinforcement fibers, where the reinforcement fibers are selected from polymer fibers, mineral fibers, non-wood natural fibers and glass-fibers and combinations thereof in a foam or foamable liquid comprising water and at least one foaming agent to obtain fiber-foam comprising 50-99% by weight of natural fibers, 1 to 50% by weight of reinforcement fibers, 0.5-10% by weight of at least one foaming agent, conveying the formed fiber-foam to a foraminous support and draining liquid trough the foraminous support to form a sheet, drying and calandering the sheet to obtain the fiber sheet, and where the foam or foamable liquid comprises at least one binder; or the formed sheet is finalized before or after drying by treating the surface of the sheet with at least one binder; or the foam or foamable liquid comprises at least one binder and the formed sheet is finalized before or after drying by treating the surface of the sheet with at least one binder.

The disclosure provides a simple, environmentally acceptable solution for replacing non-biodegradable/non-recyclable/non-renewable materials as described above, at least partly, and it provides even further advantages to the products and structure made from the fiber sheets. The currently available recycling systems can be utilized for recycling the products of the present disclosure.

In particular, it has surprisingly been found that flexible, light, biodegradable and/or recyclable fiber sheets with high strength, burst and elongation properties can be obtained. The fiber sheets may be used in a wide range of applications, such as packaging, covering, construction, interior design, graphics, clothing and fabrics, bags and sacks, and the like.

A method utilizing foam based production technology refers, in one aspect, to a method where a fiber web is formed using a foam-laid method. In one aspect, the foam-laid method is followed by finalizing. In one aspect, the finalizing is carried out by applying binder to the fibrous web with a method selected from surface treatment methods.

The disclosure is also directed to the use of the fiber sheet in applications in the field of packaging, carrier bags and sacks, covering, construction, interior design, graphics, clothing and fabrics, and the like.

BRIEF DESCRIPTION OF THE DRAWINGS

FIGS. 8A-8E illustrate laboratory scale processes used in development of certain aspects of the present disclosure.

DETAILED DESCRIPTION

Figure 1A:
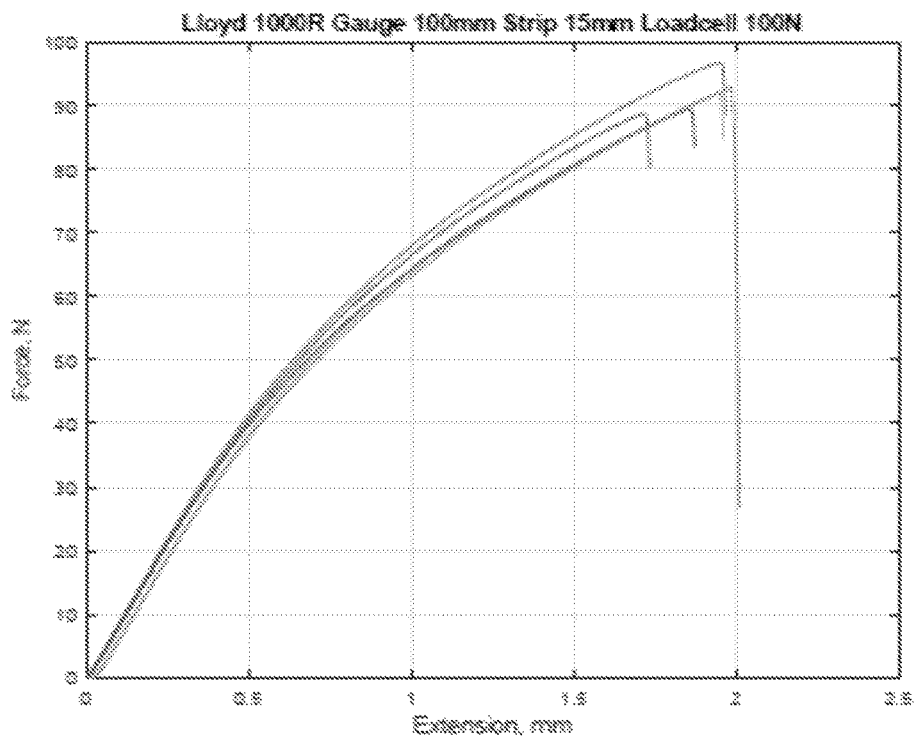
FIGS. 1A-1D illustrate pulling force as a function of elongation for certain paper, plastic and products of the present disclosure.
Figure 1B:
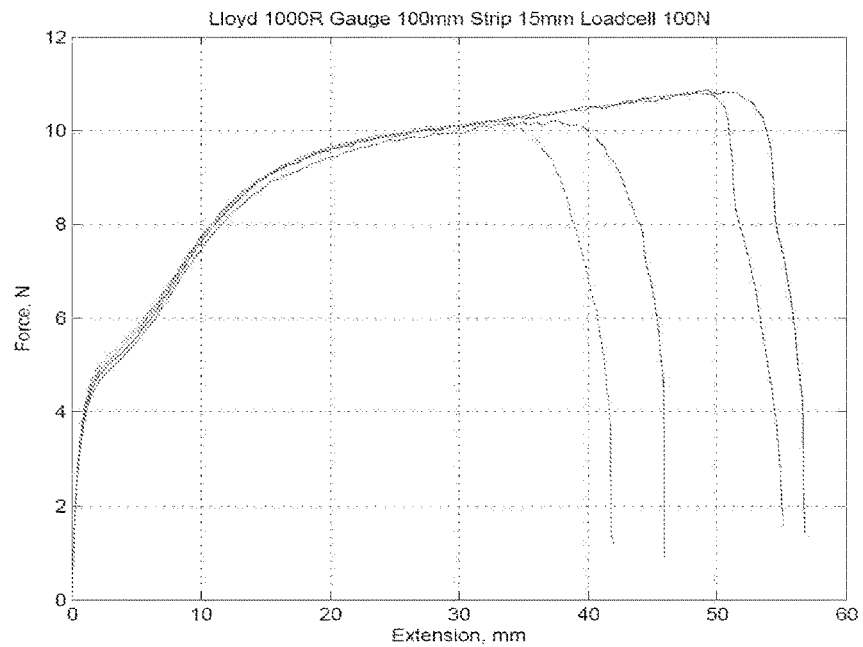
Figure 1C:
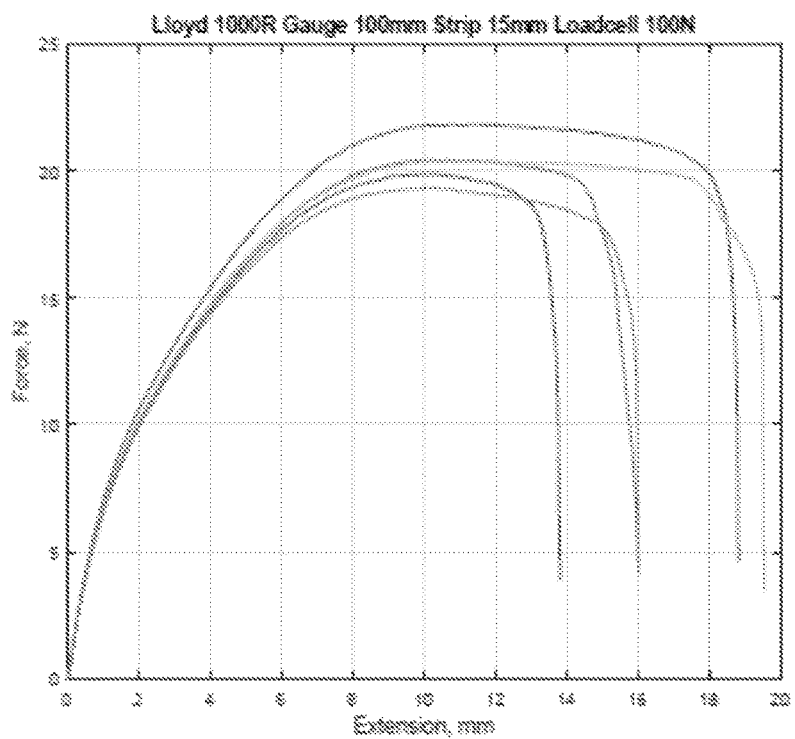
Figure 1D:
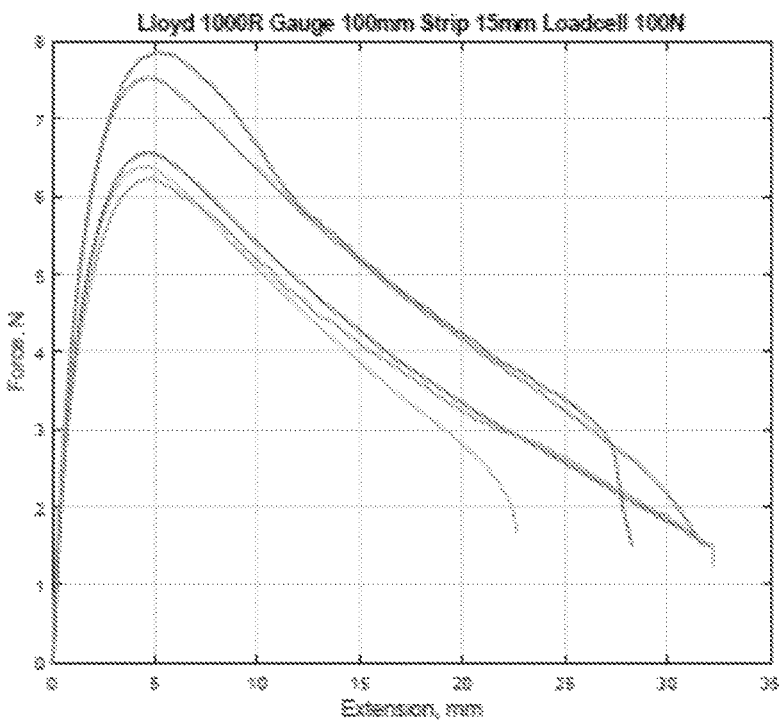

Unless otherwise specified, the terms, which are used in the specification and claims, have the meanings commonly used in the field of pulp and paper industry, as well as in packaging industry. Specifically, the following terms have the meanings indicated below.

The term "bio-degradable" refers here to material being capable of being broken down or destroyed to innocuous products or very small parts by natural processes, i.e. by the action of living things such as microorganisms.

The term "recyclable" refers here to material being capable of reusing for providing new products.

The term "biodegradable and/or recyclable products" refers here to biodegradable products, or recyclable products, or biodegradable and recyclable products.

The term "foam-laying method", also known as "foam-forming method" refers here to any conventional mono-layer and multi-layer foam-laid method used in the manufacture of non-woven products, paper products, tissue products and the like.

The term "foraminous support", also known as "foraminated support" refers here to a wire or the like.

The term "fiber sheet" refers here to flat, continuous or discontinuous mass or piece of fibrous material or fibrous web.

It was surprisingly found that burst resistant, flexible, but yet sufficiently strong, elastic and water resistant fiber sheets can be obtained from biodegradable and/or recyclable materials with a simple and cost effective process. The fiber sheets find numerous uses in the field of packaging, in carrier bags and sacks, covering, construction, interior design, graphics, clothing and fabrics, and the like.

The fiber sheet has an ideal combination of the advantageous properties of paper and plastics and thus it finds numerous applications in the fields where earlier plastic or paper has been the most popular choice.

In one embodiment, the present disclosure relates to a fiber sheet, which is obtainable by foam based production technology, it comprises fibers having average fiber length of 0.5-100 mm, a binder and a foaming agent, and where 50-99 wt % of the fibers are natural fibers and 1-50 wt % of the fibers are reinforcement fibers selected from polymer fibers, mineral fibers, non-wood natural fibers and glass-fibers and combinations thereof, and where the fiber sheet has stretch in the range of 3-50%. The fiber sheet is biodegradable and/or recyclable.

The fiber sheet can have a stretch in the range of 5-45%, particularly preferably 10-40%. Stretch is measured using the method ISO 1924-2:2008.

Obtainable by foam based technology refers to a method utilizing foam based production technology. It particularly refers to a method where a fiber web is formed using a foam-laid method, followed by finalizing. The finalizing is carried out with a method selected from surface treatment methods. A binder can be applied to the fibrous web with a method selected from surface treatment methods. The binder may alternatively be applied during the foam laid method, or with the surface treatment method and the foam laid method.

The surface treatment methods can be selected from spray coating and foam assisted methods carried out at the press section of a paper machine, where the foam laid method is carried out, from external sizing methods carried out at a paper machine, where the foam laid method is carried out, methods utilizing size press, and from conventional surface treatment methods carried out with online or offline coating machines, and foam assisted coating methods.

In some embodiments, the fiber sheet has elongation at break of 5-50%, preferably 10-40%, particularly preferably 25-40%. Elongation at break is measured using the method ISO 1924-2:2008.

The fibrous web can have grammage of 2 g/m$^2$-500 g/m$^2$, or 10 g/m$^2$-500 g/m$^2$, which may be adjusted according to the end product or structure.

Natural Fibers

The natural fibers are selected from wood pulp, non-wood plant materials, and combinations thereof.

The natural fibers may be selected from chemical pulp, such as sulphate and sulphite pulp, organosolv pulp; recycled fibers; and/or mechanical pulp including e.g. refiner mechanical pulp (RMP), pressurized refiner mechanical pulp (PRMP), pretreatment refiner chemical alkaline peroxide mechanical pulp (P-RC APMP), thermomechanical pulp (TMP), thermomechanical chemical pulp (TMCP), high-temperature TMP (HT-TMP) RTS-TMP, alkaline peroxide pulp (APP), alkaline peroxide mechanical pulp (APMP), alkaline peroxide thermomechanical pulp (APTMP), Thermopulp, groundwood pulp (GW), stone groundwood pulp (SGW), pressure groundwood pulp (PGW), super pressure groundwood pulp (PGW-S), thermo groundwood pulp (TGW), thermo stone groundwood pulp (TSGW), chemimechanical pulp (CMP), chemirefinermechanical pulp (CRMP), chemithermomechanical pulp (CTMP), high-temperature CTMP (HT-CTMP), sulphite-modified thermomechanical pulp (SMTMP), reject CTMP (CTMPR), groundwood CTMP (G-CTMP), semichemical pulp (SC), neutral sulphite semi chemical pulp (NSSC), high-yield sulphite pulp (HYS), biomechanical pulp (BRMP), pulps produced according to the OPCO process, explosion pulping process, Bi-Vis process, dilution water sulfonation process (DWS), sulfonated long fibres process (SLF), chemically treated long fibres process (CTLF), long fibre CMP process (LFCMP), Kraft wood pulp, and modifications and combinations thereof. The pulp may be a bleached or non-bleached pulp.

The wood pulp may originate from hardwood or softwood, including birch, beech, aspen such as European aspen, alder, eucalyptus, maple, acacia, mixed tropical hardwood, pine such as loblolly pine, fir, hemlock, larch, spruce such as Black spruce or Norway spruce, and mixtures thereof. Suitably pulp originating from pine is used.

Also non-wood plant raw material, such as seed hair fibers, leaf fibers, bast fibers, plant fibers can be provided from e.g. straws of grain crops, wheat straw, reed canary grass, reeds, flax, hemp, kenaf, jute, ramie, seed, sisal, abaca, coir, bamboo, bagasse, cotton kapok, milkweed, pineapple, cotton, rice, reed, esparto grass, *Phalaris arundinacea*, or combinations thereof.

Also any combinations of wood pulp and non-wood plant material may be used.

In some embodiments, the fiber sheet comprises 50-99 wt %, particularly 70-99 wt % of the natural fibers.

In some embodiments, the fiber sheet comprises 50-99 wt % of natural fibers having average fiber length 0.5-5 mm.

In some embodiments, the natural fibers have average fiber length of 0.5-5 mm, particularly 1-3 mm.

Reinforcement Fibers

The reinforcement fibers are long fibers selected from polymer fibers, mineral fibers, non-wood natural fibers and glass-fibers and combinations thereof. The polymer fibers have thermoplastic properties or they are mixed with thermoplastic materials.

The non-wood natural fibers originate from non-wood plant materials as described above.

In some embodiments, the polymer fibers are thermoplastic polymer fibers selected from polylactides (PLA), glycolic acid polymers (PGA), polyolefins (PO), polyethyleneterephthalates (PET), polyester (PES), polyvinyl alcohols (PVA), and bicomponent fibers comprising thermoplastic polymers.

The bicomponent fibers can be selected from fibers having a thermoplastic polymer as the sheet polymer (bicomponent fiber with thermoplastic surface), such as polyester (PES) core and polyethylene (PE) sheet. Suitably PES/PE bicomponent fibers can be used.

Bicomponent fibers are comprised of two polymers of different chemical and/or physical properties, extruded from the same spinneret with both polymers in the same filament.

The long reinforcement fibers add flexibility, stretch, strength and functional properties, to the fiber sheet.

Thermoplastic fibers add functional properties such as heat sealability to the fiber sheet, as well as latex binders applied as surface treatment.

In some embodiments, the fiber sheet comprises 1-50 wt % of reinforcement fibers having average fiber length of 3-100 mm.

In some embodiments, the fiber sheet comprises 1-30 wt %, particularly 1-20 wt % of the reinforcement fibers.

In some embodiments, the fiber sheet comprises at least 5 wt % of thermoplastic polymer fibers, whereby the obtained fiber sheet is heat sealable.

In some embodiments, the reinforcement fibers have an average fiber length of 5-30 mm, particularly 6-15 mm.

Binder

The fiber sheet of the present disclosure can comprises a binder in an amount of 0.005-10% by weight, preferably 0.05-5% by weight, particularly 1-5% by weight.

Suitably the binder is selected from the group consisting of polyvinyl alcohols, polyvinyl acetate dispersions, ethyl vinyl alcohol dispersions, polyurethane dispersions, acrylic latexes, styrene butadiene dispersions, binders based on finely divided cellulose, binders based on cellulose derivatives, biopolymers, such as biopolymers based on starch derivatives, natural gum latexes, alginates, guar gum, hemicellulose derivatives, chitin, chitosan, pectin, agar, xanthan, amylose, amylopectin, alternan, gellan, mutan, dextran, pullulan, fructan, locust bean gum, carrageenan, glycogen, glycosaminoglycans, murein, bacterial capsular polysaccharides, and the like, and combinations thereof.

The binder can be selected from acrylic latexes (polyacrylate latexes or polyacrylic acid latexes) and combinations thereof, optionally in combination with polyvinylalcohol.

The binder may originate from the foam laid method, or from the finalizing method or from both.

Foaming Agent

In some embodiments, the fiber sheet comprises 0.1-10 wt % of the foaming agent.

The foaming agent acts as a surface active agent, which enables the formation of the foam and additionally it provides the formed fibrous web the desired strength.

The foaming agent is selected from water-soluble foaming polymeric agent and water dispersible foaming polymeric agents and combinations thereof.

In some embodiments, the foaming agent is selected from water soluble glycans, water dispersible glycans, water soluble hydrophilic polymers and water dispersible hydrophilic polymers, and combinations thereof.

The water soluble glycans and water dispersible glycans can be selected from polysaccharides and derivatives thereof.

In some embodiments, the water soluble hydrophilic polymers and water dispersible hydrophilic polymers are selected from poly(vinyl alcohol)s and poly(vinyl acetate)s and copolymers thereof.

Optional Additives

Optionally additives modifying the functional properties of the sheet, such as heat resistance, heat sealability, opacity, printability, formability, flame resistance, etc. or providing more flexibility and/or strength can be used, and/or additives modifying the appearance of the web.

Suitably the additives are selected from nanofibrillated cellulose, microfibrillated cellulose, starch, resins etc., as well as colorants etc.

Use and Applications of the Fiber Sheet

It was surprisingly found that the highly durable and flexible fiber sheet can be used in numerous applications in the field of packaging, covering, construction, interior design, graphics, clothing and fabrics, in carrier bags and sacks, and the like. Examples of such applications are industrial packaging, carrier bags and sacks, covers, medical packaging, envelopes, coverts, medical fabrics, protective apparel, etc.

The fiber sheet can be made heat sealable by selecting the reinforcement fibers from thermoplastic polymers. Suitably combinations of thermoplastic polymers and latexes are used. Thus products like bags, sacks, flexible packaging and clothing etc. can be easily produced without the usage of glues and adhesives, with efficient heat sealing converting machinery and providing seams having suitable durability.

The fiber sheet has very good wet strength and water repellency, and thus the structures like bags and sacks maintain their form even when being in contact with moisture.

The fiber sheet can be printed if desired using printing methods used for fibrous and paper and plastic substrates, such as offset, gravure, flexo, digital printing, and the like.

The fiber sheet and structures, such as products made therefrom can be sterilized using suitable sterilization methods.

The fiber sheet and structures made therefrom can be pressed, squeezed or compressed to a small volume whereby surprisingly the products maintain the small volume and do not expand like a plastic bag etc. However, it can be reopened repeatable to its original shape and the original condition can be maintained.

The fiber sheet may be recyclable and/or at least partly or even completely biodegradable, depending on the selected materials used in the manufacture. Completely biodegradable fiber sheets are obtained from completely biodegradable materials.

The fiber sheet and structures, such as products, may be designed and manufactured according to varying needs and specifications, with respect to the composition, thickness and field of use of the desired product.

Products in the field of packaging, such as carrier bags and sacks, light and medium weight shopping bags, bags of various size for replacing conventional plastic bags in grocery shops etc., refuse sacks, wrappings of goods, industrial packages, medical packages, coverts, envelopes etc. packaging structures may be obtained from the fiber sheet.

Products in the field of construction, such as wind shield panels, protective and construction sheets, earth/ground frost insulation sheets, geotextiles and sheets in excavation may be obtained from the fiber sheet. The products provide improved protection against water and moisture intrusion.

Water resistant covers are particularly suitable for boats, cars, campers etc.

Products for use in various graphic applications, such as maps, posters, banners, flags may be obtained from the fiber sheet.

Products in the field of interior design, such as decorative sheets, may be obtained from the fiber sheet.

Products in the field of clothing and fabrics, such as protective apparel, disposable clothing, disposable cloths and sheets, medical fabrics, cloths for diapers and disposable incontinence products, and the like may be obtained from the fiber sheet.

The products and fiber sheets of the present disclosure may be disposed of by degrading them biologically, recycling them in paper and/or carton recycling systems, or by combustion.

Manufacture of the Fiber Sheet

The fiber sheet can be obtained by a method utilizing foam based production technology. In some embodiments, the fiber sheet may be obtained by a method utilizing foam based production technology, followed by finalizing by a method utilizing surface treating technology.

Also provided in this disclosure is a method for the manufacture of a fiber sheet, where the method comprises the steps of forming at least one foamed dispersion by dispersing fibers comprising natural fibers and reinforcement fibers, where the reinforcement fibers are selected from polymer fibers, mineral fibers, non-wood natural fibers and glass-fibers and combinations thereof in a foam or foamable liquid comprising water and at least one foaming agent to obtain fiber-foam comprising 50-99% by weight of natural fibers, 1 to 50% by weight of reinforcement fibers, 0.5-10% by weight of at least one foaming agent, conveying the formed fiber-foam to a foraminous support and draining liquid trough the foraminous support to form a sheet, drying and calandering the sheet to obtain the fiber sheet, and where the foam or foamable liquid comprises at least one binder; or the formed sheet is finalized before or after drying by treating the surface of the sheet with at least one binder; or the foam or foamable liquid comprises at least one binder, and the formed sheet is finalized before or after drying by treating the surface of the sheet with at least one binder.

In some embodiments, the foam or foamable liquid comprises at least one binder and the fiber-foam comprises 0.5-10% by weight of at least one binder.

The method utilizing foam based production technology is a foam-laid method generally known in the art.

A fiber web can be formed using a foam-laid method, followed by finalizing with a method selected from surface treatment methods, particularly by applying binder to the fibrous web or sheet with a method selected from surface treatment methods.

In the surface treatment method, an aqueous dispersion or foam comprising 10-70 wt %, preferably 20-50 wt % of the binder is applied on the surface of the sheet. In some embodiments, foam is used. In some embodiments, 2-50 g/m², particularly 2-10 g/m² of the binder is applied on the surface.

A method utilizing surface treating technology, i.e. surface treatment method is selected from conventional coating methods and external sizing methods used in paper and board manufacture and from spray coating and foam assisted coating methods carried out at the press section of a paper machine, and foam assisted coating methods.

The surface treatment methods can be selected from spray coating and foam assisted methods carried out at the press section of a paper machine, where the foam laid method is carried out, from external sizing methods carried out at a paper machine, where the foam laid method is carried out, methods utilizing size press, and from conventional surface treatment methods carried out with online or offline coating machines, and from foam assisted coating methods.

The methods disclosed herein can provide effective, continuous and economic means for producing the fiber sheets of the present disclosure.

Foam-Laid Method

The foam-laid method may be any foam-laid method known in the art. Typically a fiber web is formed from a dispersion of fibers in a foamed liquid. A pulp or fiber furnish is first prepared in a pulper, followed by dewatering, mixing with a foam or foamable liquid comprising a surfactant and water. The fibers are dispersed in the foam and the formed fiber-foam is deposited on a wire and the main portion of the liquid, which is essentially in the form of foam, is removed. This technique is disclosed in EP 481746.

The foam-laid method makes it possible to produce flexible, plastic like fiber webs. The foam-formation technology provides several benefits, such as even formation, controllable fiber orientation and makes it possible to use polymers and long reinforcement fibers, which are generally not suitable for water forming methods.

In the foam-laid method a binder may be used, selected from the group consisting of polyvinyl alcohols, polyvinyl acetate dispersions, ethyl vinyl alcohol dispersions, polyurethane dispersions, styrene butadiene dispersions, binders based on finely divided cellulose, binders based on cellulose derivatives, biopolymers, such as biopolymers based on starch derivatives, natural gum latexes, acrylic latexes, alginates, guar gum, hemicellulose derivatives, chitin, chitosan, pectin, agar, xanthan, amylose, amylopectin, alternan, gellan, mutan, dextran, pullulan, fructan, locust bean gum, carrageenan, glycogen, glycosaminoglycans, murein, bacterial capsular polysaccharides, and the like, and combinations thereof.

The foaming agent, also known as foaming polymer, can be selected from water-soluble foaming polymeric agent and water dispersible foaming polymeric agents and combinations thereof.

In some embodiments, the foaming agent is selected from water soluble glycans, water dispersible glycans, water soluble hydrophilic polymers and water dispersible hydrophilic polymers, and combinations thereof.

The water soluble glycans and water dispersible glycans can be selected from polysaccharides and derivatives thereof.

In some embodiments, the water soluble hydrophilic polymers and water dispersible hydrophilic polymers are selected from poly(vinyl alcohol)s and poly(vinyl acetate)s and copolymers thereof.

Optionally, the foam or foamable liquid may comprise at least one binder, particularly the amount of the binder can be 0.5-10% by weight.

The fiber-foam refers here to foamed dispersion.

Optionally, at least one additional foamed dispersion is formed of fibers comprising natural fibers and reinforcement fibers by dispersing the fibers in a foamable liquid comprising water and at least one foaming polymer.

Optionally, the foamed dispersions are conveyed to the foraminous support as individual layers.

The foraminous support can be a suitable a wire.

The draining can be suitably carried out with the aid of vacuum, using vacuum pumps, or by gravitational filtration.

Drying of the formed web or sheet is suitably carried out, for example, by heating with means conventionally used in the manufacture of non-woven, paper and tissue products.

In the method, the foamed dispersion (or dispersions) can be formed of 50-99% by weight, particularly 70-99% by weight, or more particularly 85-99% by weight of natural fibers; or 1-50% by weight, particularly 1-30% by weight, or more particularly 1-20% by weight of reinforcement fibers; 0.5-10% by weight, particularly 0.5-5% by weight, or more particularly 0.5-2% by weight of at least one foaming polymer; 0.5-10% by weight, particularly 0.5-5% by weight, or more particularly 0.5-2% by weight of at least one binder, water, and optional additives.

An additional foamed dispersion may be conveyed individually on the support, whereby a product comprising at least two individual fiber layers is obtained.

In some embodiments, the foamed dispersion comprises from 40 to 80% by volume, particularly from 55 to 75% by volume of air. Air refers here to all gases having more than 50% by volume of nitrogen content, which includes atmospheric air or gases derived from atmospheric air.

In the foam-laid method, any equipment and apparatus used in foam-formation processes in the tissue paper and non-woven manufacture can be utilized here, such as suggested, for example, in GB 1397378, EP 481746 and U.S. Pat. No. 3,716,449. Products comprising one or more foam-deposited layers may be obtained.

Optionally, the dried product (such as sheet, felt, etc.) is coated or laminated on one side or on both sides with at least one layer comprising at least one polymer.

The applying of the polymer may be carried out by coating using spray coating, extrusion coating, curtain coating or foam coating.

Finalizing of the Sheet

The sheet may be finalized utilizing surface treatment methods. The surface treatment methods can be selected from spray coating and foam assisted methods carried out at the press section of a paper machine, where the foam laid method is carried out, from external sizing methods carried out at a paper machine, where the foam laid method is carried out, methods utilizing size press, and from conventional surface treatment methods carried out with online or offline coating machines, and from foam assisted coating methods.

Surface treatment methods with foamed compositions include external sizing of fibrous web using a foamed composition and coating with a foamed composition. Any surface treatment methods with foamed compositions known in the art may be utilized, such as those described in U.S. Pat. No. 4,597,831 and in EP 0195458.

In some embodiments of the method, a substrate is treated by applying to the surface of the substrate a foamed composition comprising a liquid vehicle, a binder and a foaming agent, through at least one foam applicator, followed by breaking down mechanically at least part of the applied foam.

In some embodiments, the substrate is a sheet or web obtained from the natural fibers and reinforcement fibers using foam laid technology, as described above.

The liquid vehicle can be an aqueous solution, such as water.

In some embodiments, in the surface treatment method, an aqueous dispersion or foam comprising 10-70 wt %, preferably 20-50 wt % of the binder is applied on the surface of the sheet. Particularly foam can be used. Particularly 2-50 g/m$^2$, and more particularly 2-10 g/m$^2$ of the binder can be applied on the surface.

Suitably the binder can be selected from the group consisting of polyvinyl alcohols, polyvinyl acetate dispersions, ethyl vinyl alcohol dispersions, polyurethane dispersions, acrylic latexes, styrene butadiene dispersions, binders based on finely divided cellulose, binders based on cellulose derivatives, biopolymers, such as biopolymers based on starch derivatives, natural gum latexes, alginates, guar gum, hemicellulose derivatives, chitin, chitosan, pectin, agar, xanthan, amylose, amylopectin, alternan, gellan, mutan, dextran, pullulan, fructan, locust bean gum, carrageenan, glycogen, glycosaminoglycans, murein, bacterial capsular polysaccharides, and the like, and combinations thereof.

The foaming agent can be selected from water-soluble foaming polymeric agent and water dispersible foaming polymeric agents and combinations thereof. Preferably the foaming agent is selected from water soluble glycans, water dispersible glycans, water soluble hydrophilic polymers and water dispersible hydrophilic polymers, and combinations thereof.

The water soluble glycans and water dispersible glycans can be selected from polysaccharides and derivatives thereof.

The water soluble hydrophilic polymers and water dispersible hydrophilic polymers can be selected from poly (vinyl alcohol)s and poly(vinyl acetate)s and copolymers thereof.

The mechanical breaking down of the foam may be effected after drying with drying felts, using any suitable method, such as by suction if the foam is applied to a sheet or web still on a wire or foraminous former, or if the foam is applied to a sheet the mechanical breakdown may be effected using an a knife edge or blade, roll-nip press, or by means of rolls, rods or air knife.

After breaking down of the foam the sheet or web, which is dried and calendared, can be followed by an optional coating as described above.

Alternatively, conventional surface treatment methods carried out with online or offline coating machines may be used for finalizing the fiber sheet obtained by foam laid methods as described above. The conventional methods utilize aqueous non-foamed coating compositions comprising the binder. The coating is effected on/in the sheet or web suitably using a roll-nip press, blade-coater, spray coating device, curtain coating device, extrusion coating device.

Binders and foaming agents as described in connection with surface treatment with foamed compositions can be used, in the same amounts.

In some embodiments, acrylic latexes are used in the present disclosure.

In some embodiments, acrylic latex (polyacrylic acid) and polyvinylalcohols are used.

In some embodiments, acrylic acids are used and the manufacturing method is selected from surface treatment methods with foamed composition.

Particularly, on an industrial scale it is preferable to use a foam laid method followed by finalizing, where the binder is added in the finalizing step.

The present invention can have several advantages. It provides a continuous, effective and economic method for the manufacture of flexible fibrous webs, thus providing economic and environmental benefits. Completely bio-degradable products can be achieved if desired. The properties of the products can be tailored by adjusting the starting materials and process.

The fiber sheets provided herein can be heat-sealable in contrast to paper.

Further, the fiber sheets provided herein can be water resistant in contrast to paper.

The fiber sheets provided herein can have several properties, which are more typical to plastics than paper. Particularly, when compared with plastics, the fiber sheet can comprises mainly or even completely renewable raw material, which is recyclable and can be biodegradable.

One severe drawback of paper is the sensitivity for the moisture. If paper gets wet it loses its strength values very rapidly. In case of the fiber sheets of the present disclosure, the wetness reduces strength values only slightly.

Particularly biodegradable products can be obtained having excellent properties. Tailored products can be manufactured according to end user's need, the amounts of components, foaming polymers and binders may be varied resulting in different properties in the products.

EXAMPLES

The following examples are illustrative of embodiments of the present invention, as described above, and they are not meant to limit the invention in any way.

Example 1

Manufacture of Fibrous Sheets

The fibrous sheets were manufactured on laboratory scale as follows. Soft wood fibers were mixed with bicomponent synthetic fibers (PES/PE) in the ratio of 70:30 to the prefabricated foam made from water and polyvinyl alcohol containing soft latex (poly acrylic acid). Foam laid hand sheets were made using a method and an equipment set-up adopted in the glassfiber industry. The fiber foam was decanted into a hand sheet mold and filtrated through a wire using a vacuum chamber. Then the filtrated sheet was detached with the wire from the mold and pre-dried on the suction table. The suction table has a slit with 5 mm width, which sucks air through the sheets with ~0.2 bar vacuum. The picture series presented in FIG. 8 shows the working procedure used in the laboratory scale development work.

After drying under constant atmosphere the sheets were calandered using a Gradek laboratory calander, under nip pressure 80 bar and at roll temperature of 60° C.

The properties of the obtained fiber sheets were tested and paper and plastic were used as reference. The benefit of the fiber sheets of the present disclosure is that its properties combine the advantages of paper and plastic. The fiber sheets have smaller tensile strength than paper but similar to the plastic used in plastic bags. Paper sheet breaks down immediately, when local disruption of the fiber network occurs. Similar to plastic films, the sheet has an area of elongation with constant force. It means that even when there starts to be breakings in the structure, the material can still carry load. It also gives material flexibility to withstand large force peaks, which is exemplified in FIG. 1. FIG. 1 shows pulling force as a function of the elongation for paper (1A), plastic (1B) and samples prepared according to the present disclosure of 60 and 20 g/m$^2$ (1C and 1D).

Figure 2A:
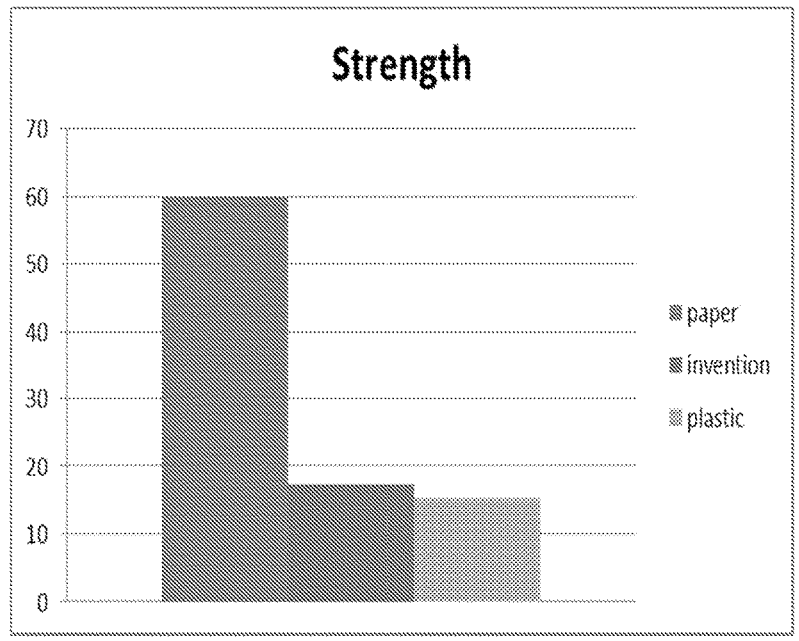
FIGS. 2A and 2B illustrate strength and TEA of certain paper, plastic and products of the present disclosure, calculated from the total areas of the curves.
Figure 2B:
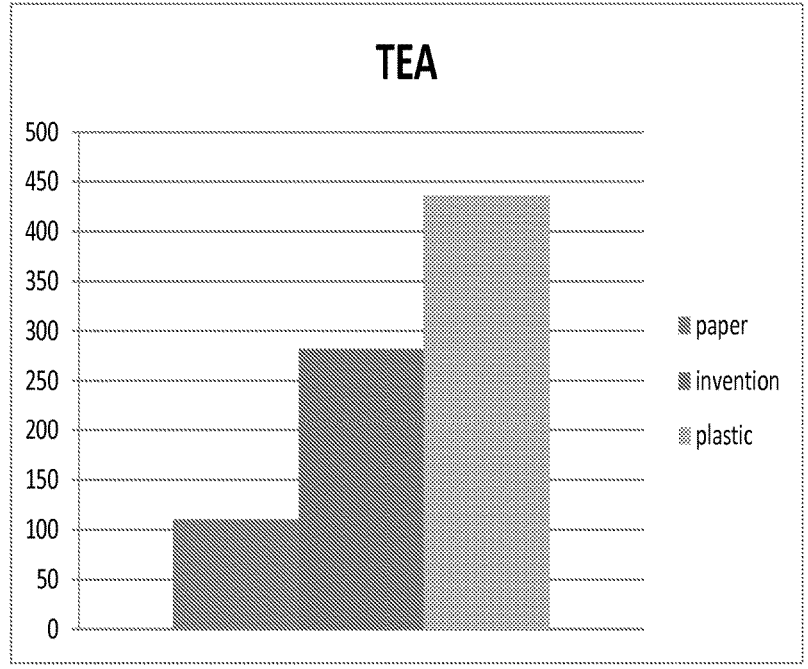

FIG. 2 presents strength (2A) and TEA (2B) of paper, plastic and products, calculated from the total areas of the curves, giving the toughness of the material. The sheets have this value higher than paper but smaller than plastic.

Figure 3:
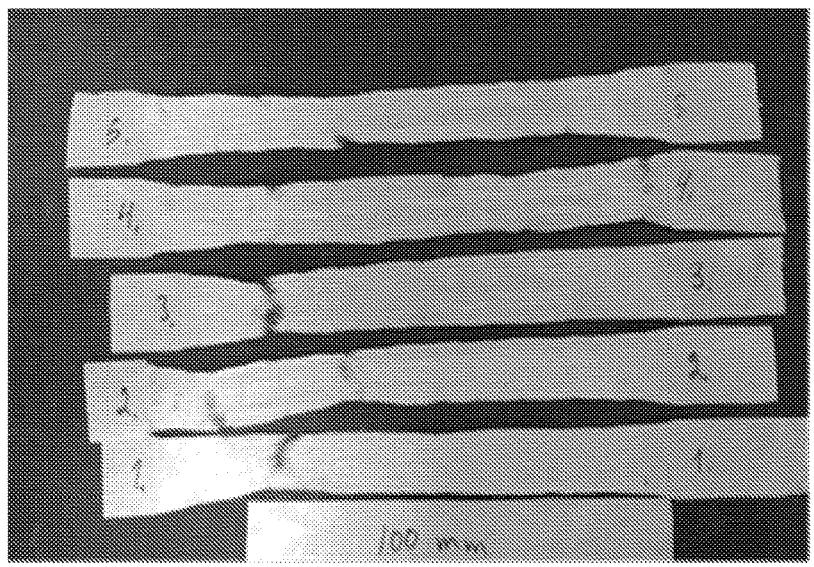
FIG. 3 illustrates strength properties of the product according to certain aspects of the present disclosure.

FIG. 3 illustrates the stretch and strength properties and mechanism of failure of the samples, as pictures of the test strips used in the measurements. Samples 1-5 are parallel samples made according to the disclosed methods. In this test, samples prepared according to the present discourse, after strength measurements, were used. The complete breaking from one point, using paper as reference, was observed. The samples of the present disclosure stretched significantly before breaking, finally breaking occurred at one or more points.

FIG. 4 illustrates the properties of the samples, when contacted with water. One severe drawback of conventional paper is the sensitivity for the moisture. If a paper sheet absorbs moisture, it loses its strength properties very rapidly. In case of the sheets disclosed herein, the wetness of the sample reduces strength values only slightly.

In FIG. 4, in 4A and in 4B, the behaviour of the water droplet on the surface of a conventional paper bag (left and middle samples, both sides of the bag) and of the material as disclosed herein (samples on the right, after time period 15 seconds and after 30 seconds). The paper bag had absorbed the water droplets, whereas the water droplet on the surface of the sample as disclosed herein remained unchanged. After 40 minutes (4C), the water droplet still can be seen on the surface of the material as disclosed herein.

Figure 4A:
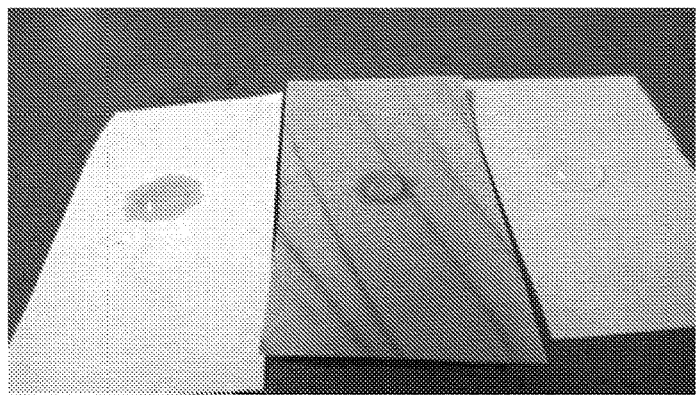
FIGS. 4A-4E illustrate properties of the samples according to certain aspects of the present disclosure, when contacted with water.
Figure 4B:
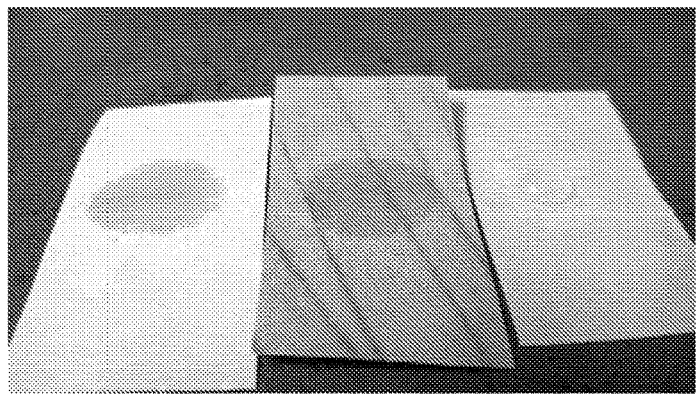
Figure 4C:
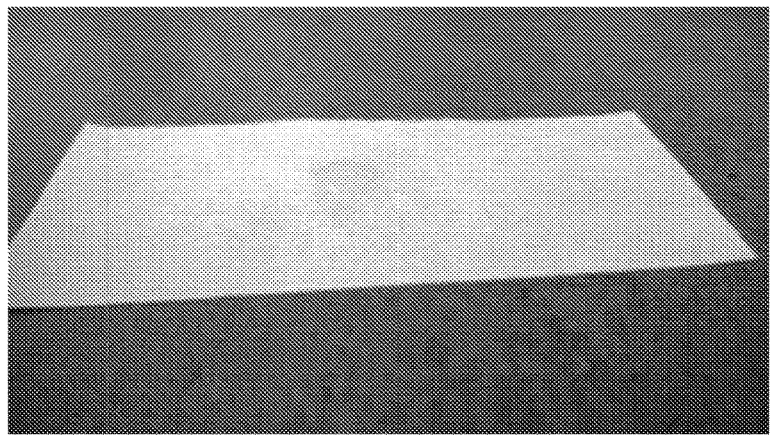
Figures 4D, 4E:
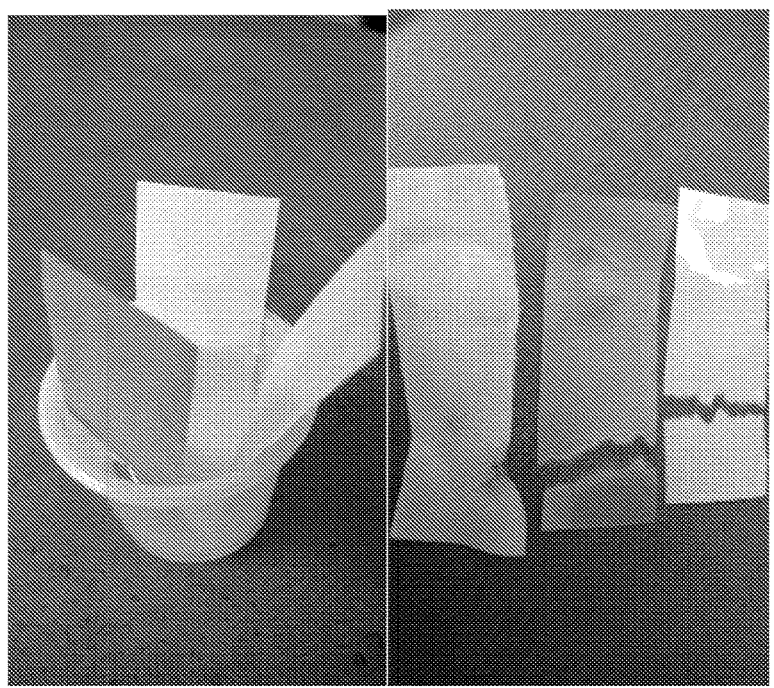
Figure 5A:
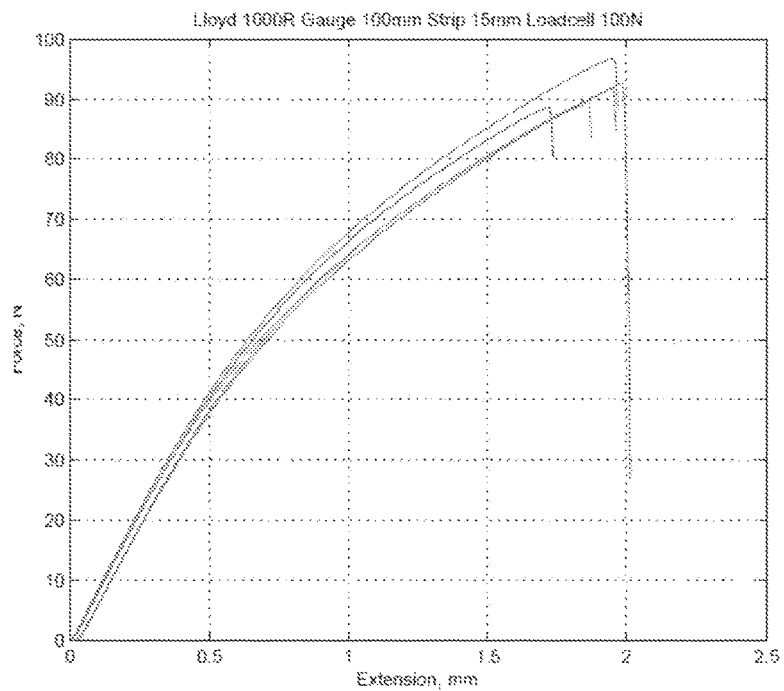
FIGS. 5A-5D illustrate the stretch and strength properties of the wet sample according to certain aspects of the present disclosure, using paper as reference.
Figure 5B:
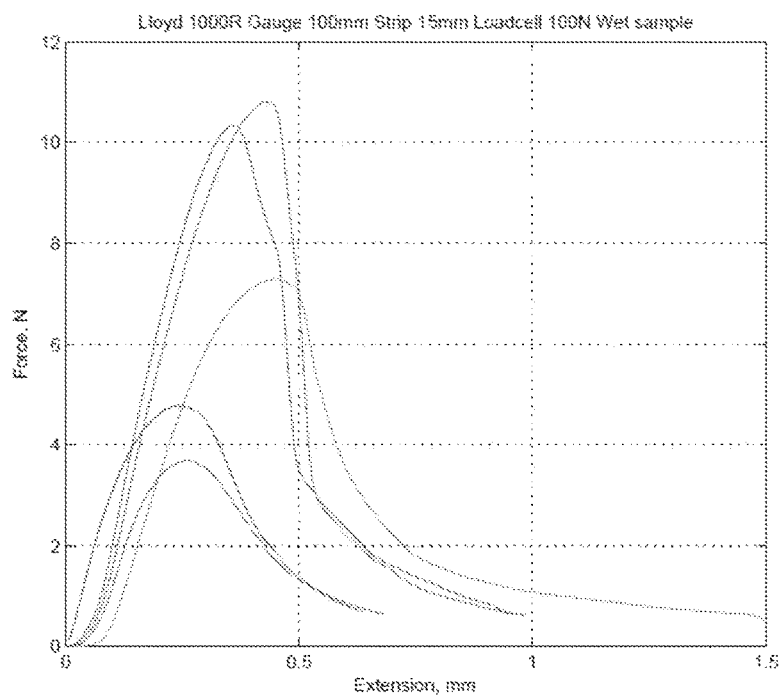
Figure 5C:
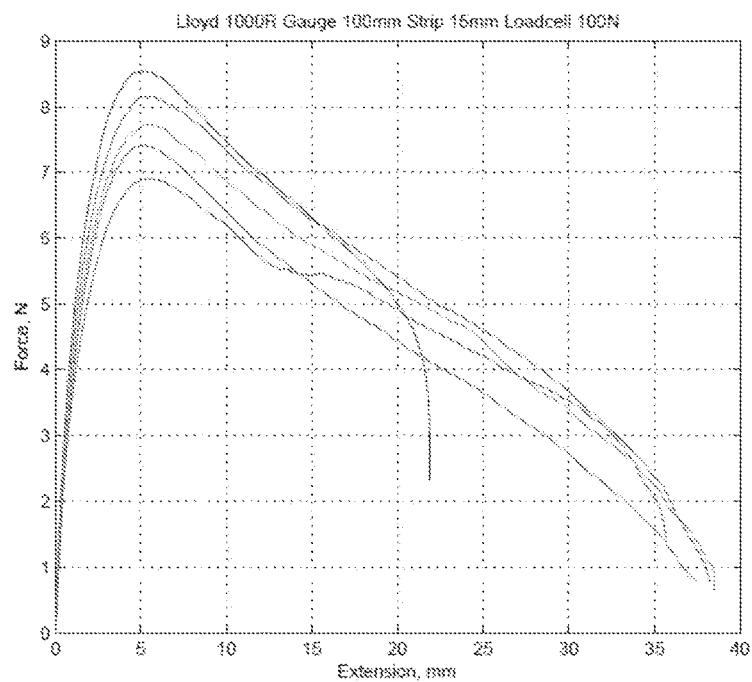
Figure 5D:
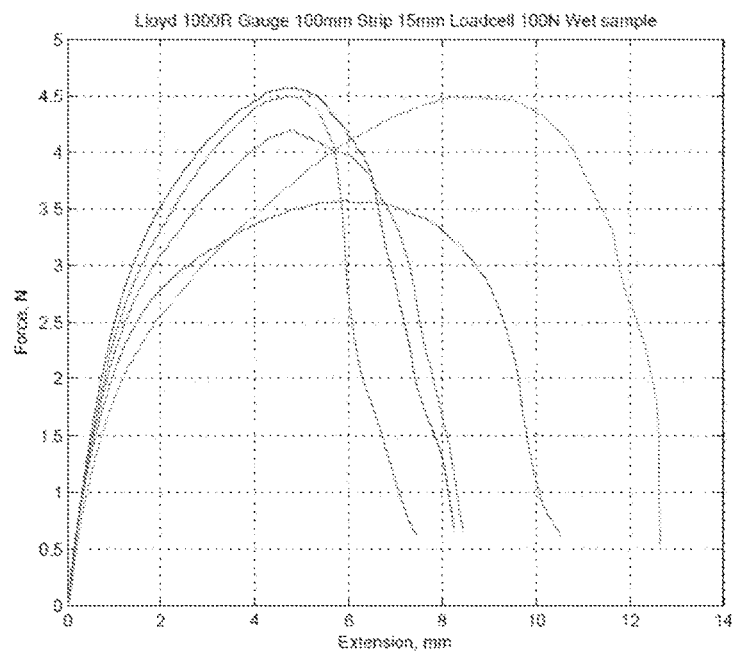

FIGS. 4, 4D and 4E illustrates samples of paper, of conventional paper bag (brown, resin sized) and of the material as disclosed herein, where the samples were set in water (4D). After 3 minutes the samples were removed from the water and drawn (4E). The paper materials broke similar way, but the material as disclosed herein stretched before a breakdown.

FIG. 5 illustrates the stretch and strength properties of a wet sample as disclosed herein, using paper as reference. A water droplet of the size of 200 µl was put on the samples and allowed to absorb in the structure: for the paper it took 40 seconds, for the sample prepared as disclosed herein, it took 40 minutes, and rest of the water was dried away using a paper towel. Elongation was measured from the samples. Elongation of dry paper sample is presented in FIG. 5A, and of wet paper sample in FIG. 5B. Elongation of the dry sample prepared as disclosed herein is presented in FIG. 5C and of wet paper sample in FIG. 5D. The water droplet was absorbed in the conventional paper and also in brown paper bag in 30 seconds, whereas the fiber sheet prepared as disclosed herein repelled water. The elongation of paper decreased from 2% to less than 0.7% in the wet sample. The fiber sheet absorbed ⅔ of the water droplet after 40 minutes. The elongation decreased from 37% to 9% in the moist sample prepared as disclosed herein.

Figure 6:
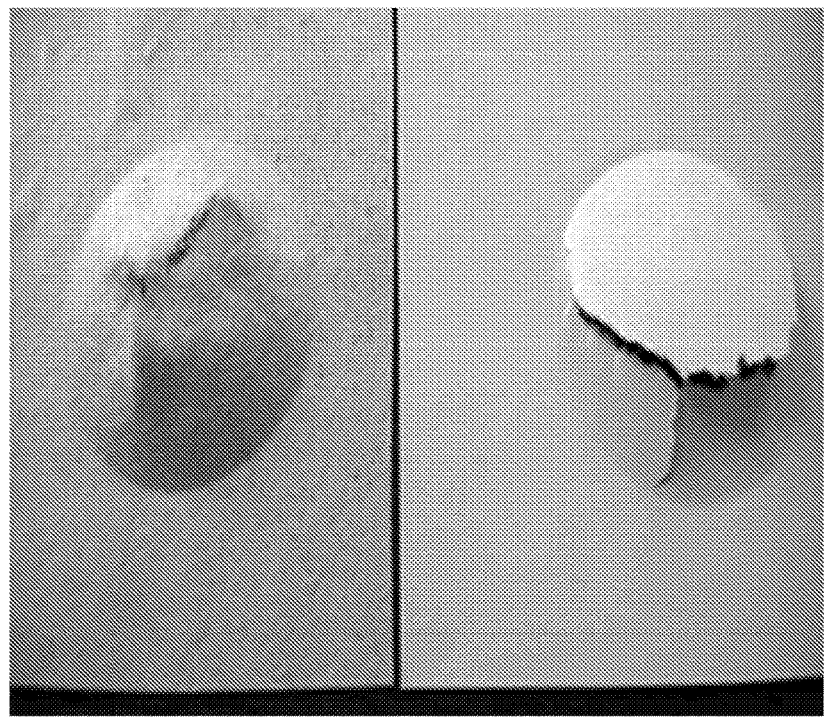
FIG. 6 illustrates beneficial bursting behavior of products according to certain aspects of the present disclosure.

FIG. 6 illustrates the bursting strength of a sample prepared as disclosed herein (left) and paper (right). In the case of paper, after initial burst, the whole section under pressure rips open, whereas in the case of the sheet prepared as disclosed herein only the cap of the pressed area is damaged. This indicates much better resistance to withstand puncture, which is a highly critical property particularly in packaging applications.

Figure 7:
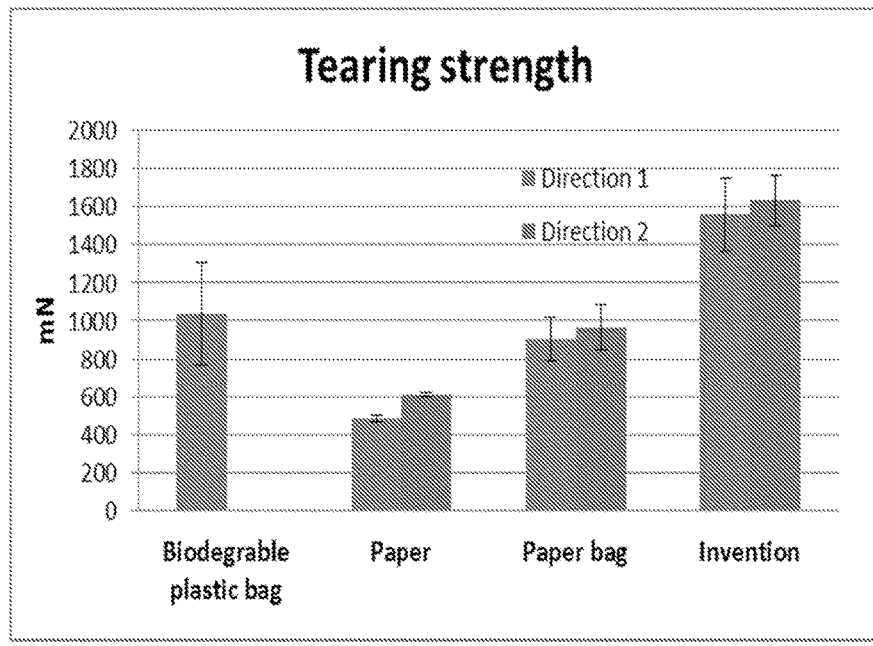
FIG. 7 illustrates tear strength of products according to certain aspects of the present disclosure.

FIG. 7 illustrates the tear strength of a sample prepared as disclosed herein. The tear strength of the sheet prepared as disclosed herein is over 70% higher than that for typical paper bag material (kraft paper), over 200% higher than that for conventional paper, and over 50% higher than that of biodegradable plastic film. The plastic shopping bag measured had a tear strength of 6200 mN.

Example 2

Manufacture of Bags From Fiber Sheets

Figure 9A:
FIGS. 9A and 9B illustrate bags made from the fiber sheets according to certain aspects of the present disclosure.
Figure 9B:
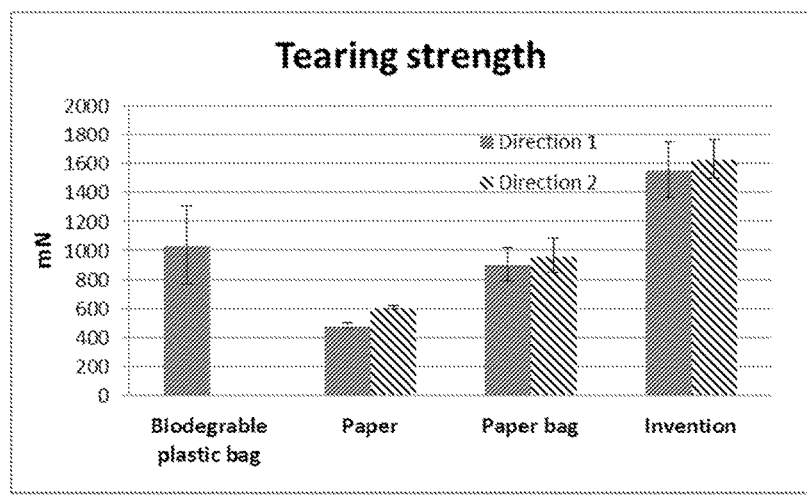

Bags were made from fiber sheets manufactured as follows. Fiber sheets were obtained with the foam-laid method as described in example 1. Soft wood (pine) fibers were mixed with bicomponent synthetic fibers (PES/PE) in the ratio of 70:30 to the prefabricated foam made from water and polyvinyl alcohol (PVA) containing soft latex (poly acrylic acid). After drying under constant atmosphere the sheets were calandered. Fiber sheets containing 10 wt % of PVA and latex (total) and having grammage of 30 g/m$^2$ and 80 g/m$^2$ were obtained. Heat sealed bags were made of the fiber sheets. The bags were repeatedly compressed to small balls and reopened to the original shape without any alterations in the appearance and no breakage was observed. The bags can be turned around like socks. A photo of the bags is presented in FIG. 9A and tearing strength of plastic bags, paper bags, paper and the bags made in this example is presented in FIG. 9B.

What is claimed is:

1. A fiber sheet comprising:
fibers having an average fiber length of 0.5-100 mm,
a binder selected from the group consisting of a polyvinyl alcohol, a polyvinyl acetate dispersion, an ethyl vinyl alcohol dispersion, a polyurethane dispersion, an acrylic latex, a styrene butadiene dispersion, a binder based on finely divided cellulose, a binder based on cellulose a derivative, a biopolymer, and combinations thereof, and
a foaming agent, and
wherein 50-99 wt % of the fibers are natural fibers and 1-50 wt % of the fibers are reinforcement fibers selected from the group consisting of a polymer fiber, a mineral fiber, a non-wood natural fiber, a glass-fiber, and combinations thereof,
and wherein the fiber sheet has a stretch in the range of 3-50%.

2. The fiber sheet according to claim 1, the fiber sheet is biodegradable and/or recyclable.

3. The fiber sheet according to claim 1, wherein the reinforcement fibers are the polymer fiber, and wherein the polymer fiber comprises at least one thermoplastic polymer selected from the group consisting of polylactides (PLA), glycolic acid polymers (PGA), polyolefins (PO), polyethyleneterephthalates (PET), polyester (PES), polyvinyl alcohols (PVA) and bicomponent fibers comprising thermoplastic polymers.

4. The fiber sheet according to claim 3, wherein the at least one thermoplastic polymer is the bicomponent fibers, and wherein the bicomponent fibers comprise a fiber having a thermoplastic polymer as a sheath polymer.

5. The fiber sheet according to claim 1, wherein the foaming agent comprises at least one foaming agent selected from the group consisting of water-soluble foaming agents, dispersible foaming agents, and combinations thereof.

6. The fiber sheet according to claim 1, wherein the foaming agent comprises at least one foaming agent selected from the group consisting of a polysaccharide, a polysaccharide derivative, a poly(vinyl alcohol), a poly(vinyl acetate), a poly(vinyl acetate) copolymer, and combinations thereof.

7. The fiber sheet according to claim 1, wherein the fiber sheet has a stretch in the range of 5%-45%.

8. The fiber sheet according to claim 1, wherein the binder comprises an acrylic latex.

9. The fiber sheet according to claim 1, wherein the fiber sheet it is obtained by a foam based production technology comprising a foam-laid method followed by finalizing by treating the surface of the fiber sheet with a binder.

10. An article comprising the fiber sheet of claim 1, wherein the article is selected from the group consisting of a package, a carrier bag, a sack, a shopping bag, a refuse sack, a wrapping of goods, an industrial package, a medical package, a covert, an envelope or a bag for replacing a plastic bag.

11. An article comprising the fiber sheet of claim 1, wherein the article is selected from the group consisting of a wind shield panel, a protective and construction sheet, an earth/ground frost insulation sheet, a geotextiles and sheet in excavation.

12. An article comprising the fiber sheet of claim 1, wherein the article is selected from the group consisting of a clothing, a fabric, a protective apparel, a disposable clothing, a disposable cloth, a disposable sheet, a cover, and a medical fabric.

13. An article comprising the fiber sheet of claim 1, wherein the article is selected from the group consisting of a map, a poster, a banner, a flag or a decorative sheet.

14. A method for the manufacture of the fiber sheet of claim 1, the method comprising:
 forming at least one foamed dispersion by dispersing fibers comprising natural fibers and reinforcement fibers, wherein the reinforcement fibers comprise at least one reinforcement fiber selected from the group consisting of a polymer fiber, a mineral fiber, a non-wood natural fiber, a glass-fiber, and combinations thereof, in a foam or foamable liquid comprising water and at least one foaming agent to obtain a fiber-foam comprising 50%-99% by weight of natural fibers, 1% to 50% by weight of reinforcement fibers, and 0.5%-10% by weight of at least one foaming agent,
 conveying the formed fiber-foam to a foraminous support and draining the liquid through the foraminous support to form a sheet, and
 drying and calandering the sheet to obtain the fiber sheet, wherein the foam or foamable liquid comprises at least one binder; or the formed sheet is finalized before or after drying by treating the sheet with at least one binder; or the foam or foamable liquid comprises at least one binder and the formed sheet is finalized before or after drying by treating the sheet with at least one binder, and
 wherein the binder is selected from the group consisting of a polyvinyl alcohol, a polyvinyl acetate dispersion, an ethyl vinyl alcohol dispersion, a polyurethane dispersion, an acrylic latex, a styrene butadiene dispersion, a binder based on finely divided cellulose, a binder based on a cellulose derivative, a biopolymer, and combinations thereof.

15. The method according to claim 14, wherein the binder comprises an acrylic latex.

16. The method according to claim 14, wherein the reinforcement fibers are the polymer fiber, and wherein the polymer fiber comprises at least one thermoplastic polymer fiber selected from the group consisting of a polylactide (PLA), a glycolic acid polymer (PGA), a polyolefin (PO), a polyethyleneterephthalate (PET), a polyester (PES), a polyvinyl alcohol (PVA), a bicomponent fiber comprising a thermoplastic polymer, and combinations thereof.

17. The method according to claim 16, wherein the thermoplastic polymer is the bicomponent fibers, and wherein the bicomponent fibers comprise a fiber having a thermoplastic polymer as a sheath polymer.

18. The method according to claim 14, wherein the foaming agent comprises at least one of a foaming agent selected from the group consisting of a water-soluble foaming agent, a dispersible foaming agent, and combinations thereof.

19. The method according to claim 14, wherein the foaming agent comprises at least one foaming agent selected from the group consisting of a polysaccharide, a polysaccharide derivative, a poly(vinyl alcohol), a poly(vinyl acetate), a poly(vinyl acetate) copolymer, and combinations thereof.

20. The method according to claim 14, wherein the formed sheet is finalized before or after drying by treating the sheet with at least one binder; or the foam or foamable liquid comprises at least one binder and the formed sheet is finalized before or after drying by treating the sheet with at least one binder; and wherein the finalizing comprises a surface treatment method.

21. The method according claim 20, wherein the surface treatment method is selected from the group consisting of a spray coating methods and foam assisted methods carried out at the press section of a paper machine, where the foam laid method is carried out, from external sizing methods carried out at a paper machine, where the foam laid method is carried out, methods utilizing size press, and from conventional surface treatment methods carried out with online or offline coating machine, and foam assisted coating methods.

22. The method according to claim 14, wherein the foam or foamable liquid comprises no binder, and the formed sheet is finalized before or after drying by treating the surface of the sheet with at least one binder.

23. The fiber sheet according to claim 1, wherein the foaming agent comprises at least one foaming agent selected from the group consisting of a water-soluble glycan, a water-dispersible glycan, a water-soluble hydrophilic polymers, a water-soluble hydrophilic copolymer, a water-dispersible hydrophilic polymer, a water-dispersible hydrophilic copolymers, and combinations thereof.

24. The fiber sheet according to claim 1, wherein the fiber sheet has a stretch in the range of 10-40%.

25. The method according to claim 14, wherein the foaming agent comprises at least one of a foaming agent selected from the group consisting of a water-soluble glycan, a water-dispersible glycan, a water-soluble hydrophilic polymer, a water-soluble hydrophilic copolymer, a water-dispersible hydrophilic polymer, a water-dispersible hydrophilic copolymer, and combinations thereof.

26. The method according to claim 14, wherein the formed sheet is finalized before or after drying by treating the sheet with at least one binder; or the foam or foamable liquid comprises at least one binder and the formed sheet is finalized before or after drying by treating the sheet with at least one binder; and wherein the finalizing comprises a surface treatment method and the surface treatment method comprises applying the binder to the sheet.

* * * * *